(12) United States Patent
Albrecht et al.

(10) Patent No.: US 10,069,789 B2
(45) Date of Patent: Sep. 4, 2018

(54) COMMUNICATION DEVICE AND METHOD FOR PROVIDING A NAME SERVICE WITHIN AN INDUSTRIAL AUTOMATION SYSTEM

(71) Applicant: Siemens Aktiengesellschaft, Munich (DE)

(72) Inventors: Harald Albrecht, Nuremberg (DE); Georg Biehler, Nuremberg (DE); Thomas Talanis, Heroldsbach (DE)

(73) Assignee: Siemens Aktiengesellschaft, Munich (DE)

( * ) Notice: Subject to any disclaimer, the term of this patent is extended or adjusted under 35 U.S.C. 154(b) by 92 days.

(21) Appl. No.: 15/141,204

(22) Filed: Apr. 28, 2016

(65) Prior Publication Data

US 2016/0330168 A1    Nov. 10, 2016

(30) Foreign Application Priority Data

May 4, 2015    (EP) .................................... 15166255

(51) Int. Cl.
*H04L 29/12* (2006.01)
*H04L 12/751* (2013.01)
(Continued)

(52) U.S. Cl.
CPC .......... *H04L 61/1511* (2013.01); *H04L 45/02* (2013.01); *H04L 45/16* (2013.01);
(Continued)

(58) Field of Classification Search
CPC . H04L 61/1511; H04L 67/12; H04L 61/2038; H04L 45/16; H04L 61/303; H04L 61/2092; H04L 61/2076; H04L 61/609
See application file for complete search history.

(56) References Cited

U.S. PATENT DOCUMENTS

| 7,979,581 B2 * | 7/2011 | Aso ................... H04L 29/12066 709/245 |
| 7,991,913 B2 * | 8/2011 | Yan ..................... H04L 12/2898 709/229 |

(Continued)

FOREIGN PATENT DOCUMENTS

| EP | 1 965 540 A1 | 9/2008 |
| EP | 2 940 926 A1 | 11/2015 |

(Continued)

OTHER PUBLICATIONS

Park D. et al.: "IPv6 Extensions for DNS Plug and Play"; draft-park-ipv6-extensions-dns-pnp-00.txt; Internet-Draft; XP015004780; ISSN: 0000-0004; 2003, pp. 1-60.

(Continued)

*Primary Examiner* — Edan Orgad
*Assistant Examiner* — Saumit Shah
(74) *Attorney, Agent, or Firm* — Cozen O'Connor

(57) ABSTRACT

A method for providing a name service within an industrial automation system, wherein communication devices of the industrial automation system each check via a name service component whether a device name with a topological or hierarchical name component, which essentially completely designates a spatial or hierarchical arrangement of the respective communication device, is allocated to the respective communication device, where in cases of a positive check result, the communication devices each designate their associated device name as complete device name, and where in cases of a negative check result, the communication devices each independently generate their complete device name from topological or hierarchical name components distributed via messages with router advertisements and a name component unambiguous within their respective subnetwork.

16 Claims, 5 Drawing Sheets

(51) Int. Cl.
*H04L 12/761* (2013.01)
*H04L 29/08* (2006.01)

(52) U.S. Cl.
CPC ........ *H04L 61/2038* (2013.01); *H04L 61/303* (2013.01); *H04L 67/12* (2013.01); *H04L 61/2076* (2013.01); *H04L 61/2092* (2013.01); *H04L 61/609* (2013.01)

(56) References Cited

U.S. PATENT DOCUMENTS

| | | |
|---|---|---|
| 8,194,661 B2 | 6/2012 | Bolan et al. |
| 2004/0230446 A1 | 11/2004 | Park et al. |
| 2008/0320111 A1 | 12/2008 | Yan et al. |
| 2010/0281146 A1* | 11/2010 | Lee .................. H04L 29/12066 709/221 |
| 2010/0312890 A1 | 12/2010 | Bernosky |
| 2011/0075666 A1 | 3/2011 | Bolan et al. |
| 2013/0151725 A1* | 6/2013 | Baginski ............... H04L 61/251 709/245 |
| 2015/0066979 A1* | 3/2015 | Zhang ................ H04L 61/1511 707/769 |
| 2015/0312096 A1* | 10/2015 | Albrecht ............. H04L 41/0803 709/220 |
| 2015/0312213 A1* | 10/2015 | Albrecht ............. H04L 61/3015 709/245 |
| 2016/0330168 A1* | 11/2016 | Albrecht ............... H04L 61/303 |

FOREIGN PATENT DOCUMENTS

| | | |
|---|---|---|
| EP | 2 940 972 A1 | 11/2015 |
| RU | 2490814 C | 8/2013 |
| WO | WO 2007/144364 A1 | 12/2007 |
| WO | WO 2013/049007 A1 | 4/2013 |

OTHER PUBLICATIONS

Cheshire et al: "Multicast DNS"; Internet Engineering task force, IETF, Standard Internet Society (ISOC); pp. 1-70; ISSN: 2070-1721; XP015090289; 2013.

Jeong J.-H. et al.: "IPv6 Router Advertisement based DNS Autoconfiguration"; draft-jeong-ipv6-ra-dns-autoconf-00.txt; XP015003801; ISSN: 0000-0004; 2003, pp. 1-11.

Albrecht, Harald: "Hierarchical (host) domain names in mDNS?"; pp. 1-2; XP55175361; 2013.

* cited by examiner

COMMUNICATION DEVICE AND METHOD FOR PROVIDING A NAME SERVICE WITHIN AN INDUSTRIAL AUTOMATION SYSTEM

BACKGROUND OF THE INVENTION

1. Field of the Invention

The present invention relates to industrial automation systems comprising automation devices interconnected with one another via an industrial communication network and, more particularly, to a communication device and method for providing a name service within an industrial automation system.

2. Description of the Related Art

Generally, an industrial automation system comprises a multiplicity of automation devices interconnected with one another via an industrial communication network, and is typically used to control or regulate plants, machines or devices as part of a production or process automation. Due to time-critical boundary conditions in technical systems automated via industrial automation systems, real-time communication protocols, such as PROFINET, PROFIBUS or real-time-Ethernet, are mainly used for communication between automation devices in industrial communication networks.

Interruptions of communication links between computer units of an industrial automation system or automation devices can lead to an unwanted or unnecessary repetition of a transmission of a service request. This repetition causes additional loading on communication links of the industrial automation system that can lead to further system disturbances or errors. A particular set of problems in industrial automation systems regularly results from message traffic with relatively many but relatively short messages as a result of which the above problems are intensified.

Due to a utilization for frequently extremely different applications, problems can arise in Ethernet-based communication networks, for example, when network resources are claimed for a transmission of short data frames competing with real-time requirements for a transmission of data frames having a large content of useful data. This can lead to a delayed transmission of the data frames with real-time requirements or even to a loss of individual ones of such data frames.

WO 2007/144364 A1 describes a method for networking an automated plant that comprises at least one cell with a subnetwork. The subnetwork is connected via a router to a further subnetwork of the automated plant. To network the automated plant, a multicast group is provided that extends over both subnetworks. By means of the multicast group, a communication network address of a communication network interface of an assembly is detected. In this context, the assembly has joined the multicast group previously via the communication network address and the communication network interface has been connected previously to the subnetwork. Via the communication network address, a name is assigned to the communication network interface of the assembly. In a further step, a further communication network address of the communication network interface of the assembly is determined which exhibits at least a part of a numeric representation of the name.

U.S. Pat. No. 8,194,661 B2 discloses a method for the automatic configuration of a communication device within a segmented communication network in which a monitoring unit checks whether a received IPv6 data packet comprises a router advertisement or a router solicitation. In the case of a router solicitation, a MAC sender address of the data packet is removed from the IPv6 data packet by the monitoring unit. In addition, the monitoring unit inserts an external MAC address into the IPv6 data packet in order to forward the latter as a multicast message to a router. In the case of a router advertisement, the monitoring unit removes a MAC router address from the IPv6 data packet and inserts instead an internal MAC address into the IPv6 data packet in order to forward the latter as a unicast message to the communication device to be configured.

European patent application EP 14166194.2 relates to a method for configuring a communication device within an industrial automation system in which a configuration unit of the communication device transmits a datagram with a configuration request to a configuration server. Following the configuration request, the configuration server assigns to the communication device at least a first topological device name component that is allocated to a spatial or hierarchical arrangement of the configuration server. Each forwarding distributor unit adds a further topological device name component that is allocated to a spatial or hierarchical arrangement of the respective forwarding distributor unit. The configuration unit of the communication device generates from the topological device name components and a name component unambiguous within its subnetwork its device name.

European patent application EP 14166376.5 discloses a method for providing a name service within an industrial communication system in which IPv6 prefixes are distributed by routers via messages with router advertisements in respective lower-level subnetworks. In this context, the router advertisements comprise a topological or hierarchical name component of the respective router that is allocated to a spatial or hierarchical arrangement of the respective router. Router advertisements with name information from higher-level subnetworks are received by routers allocated to lower-level subnetworks and supplemented by a topological or hierarchical name component allocated to the respective router and distributed within the respective lower-level subnetwork. Communication terminals independently generate their device name from topological or hierarchical name components and a name component which is unambiguous within their respective subnetwork.

From European patent application EP15162021.8, it is known that a name service server of an industrial automation system for providing a name service sends out messages with router advertisements that comprise information on an IPv6 address of the name service server. Communication terminals generate their IPv6 address independently from IPv6 prefixes distributed within their respective subnetwork via router advertisements. In addition, communication terminals generate their device name independently from topological or hierarchical name components and a name component unambiguous within their respective subnetwork. Communication devices each comprise a name service client for dynamic DNS (Domain Name System) by which storage of an IPv6 address and an associated device name of the respective communication device is requested in the name service server via the IPv6 address of the name service server.

SUMMARY OF THE INVENTION

It is an object of the present invention to provide a communication device and method for providing a name service within an industrial communication system that provides for both a simple integration of existing device names and for a decentralized automated device configuration.

This and other objects and advantages are achieved in accordance with the invention by a communication device and method in which, in order to provide a name service within an industrial automation system, communication devices of the industrial automation system each check, via a name service component, whether a device name with a topological or hierarchical name component that essentially completely designates a spatial or hierarchical arrangement of the respective communication device is allocated to the respective communication device. In the case of a positive result of the check, the communication devices each treat their associated device name as a complete device name. On the other hand, in the case of a negative result of the check, the communication devices each independently generate their complete device name from topological or hierarchical name components distributed via messages with router advertisements and a name component unambiguous within their respective subnetwork. The device names can be, for example, PROFINET device names.

In accordance with the invention, the communication devices each request via a name service client for dynamic DNS, storage of their communication network address and their associated complete device name in a name service server. Alternatively or additionally, the communication devices, each distribute via a name service component for multicast DNS, information about their communication network address and their associated complete device name within their respective subnetwork in accordance with the Multicast DNS Protocol. In this way, the method in accordance with the invention also enables domain names for automation devices to be formed automatically decentrally and registered centrally. In particular, operators of industrial automation systems are released from investing expenditures in a name and address administration or specialized projecting tools. In addition, topology changes in industrial automation systems can be controlled in a simple manner by means of the method according to the invention and do not require any manual name and address adaptations susceptible to errors.

In accordance with an advantageous embodiment of the present invention, communication devices that each have a router function and are each integrated in an automation device, in the case of a positive result of the check, distribute a complete topological or hierarchical name component, comprised of their device name, as name information within their respective lower-level subnetwork via router advertisements. The communication devices that each have a router function and are each integrated in an automation device, in the case of a negative result of the check, preferably receive router advertisements with name information from higher-level subnetworks, supplement these by a topological or hierarchical name component that is allocated to their respective spatial or hierarchical arrangement and distribute supplemented name information within their respective lower-level subnetwork via router advertisements.

Communication devices that each have a router function and no automation function each receive, in accordance with a further embodiment of the present invention, router advertisements with name information from higher-level subnetworks and distribute these within their respective lower-level subnetwork via router advertisements. In addition, a communication device that is allocated to a name hierarchy origin or a root network node advantageously treats its associated device name as a complete device name. In this manner, an initial name context can be fed simply and reliably into an hierarchical network topology.

In accordance with a preferred embodiment of the present invention, the communication network addresses of the communication devices are IPv6 addresses. In this context, the communication devices advantageously generate their IPv6 address independently from IPv6 prefixes distributed via router advertisements within their respective subnetwork. Messages with router advertisements are advantageously transmitted in accordance with Internet Control Message Protocol Version 6. In this way, a reliable name and address autoconfiguration of the communication devices can be ensured.

Additionally, the communication devices can each also request storage of associated alias names in the name service server via their name service client for dynamic DNS. Alternatively or additionally, the communication devices each additionally distribute information on their associated alias names within their respective subnetwork in accordance with Multicast DNS Protocol via their name service component for multicast DNS.

It is also an object of the invention to provide a communication device that is configured to implement the method in accordance with disclosed embodiments and comprises a name service component for checking whether a device name with a topological or hierarchical name component which essentially completely designates a spatial or hierarchical arrangement of the respective communication device is allocated to the respective communication device. In this context, the communication device is configured to treat, in the case of a positive result of the check, its associated device name as complete device name and, in the case of a negative result of the check, independently generating its complete device name from topological or hierarchical name components and a name component that is unambiguous within their respective subnetwork.

In addition, the communication device in accordance with the invention comprises a name service client for dynamic DNS for requesting storage of a communication network address of the communication device and of the complete device name in a name service server and/or a name service component for multicast DNS for distributing information about the communication network address and the complete device name within a subnetwork in accordance with Multicast DNS Protocol.

In accordance with an advantageous embodiment of the communication device, a router function can be provided. In addition, the communication device, in accordance with a further embodiment, is integrated in an automation device or allocated to an origin of a device hierarchy, respectively.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the text which follows, the present invention will be explained in greater detail in an exemplary embodiment, by means of the drawing, in which.

DETAILED DESCRIPTION OF THE EXEMPLARY EMBODIMENTS

Figure 1:
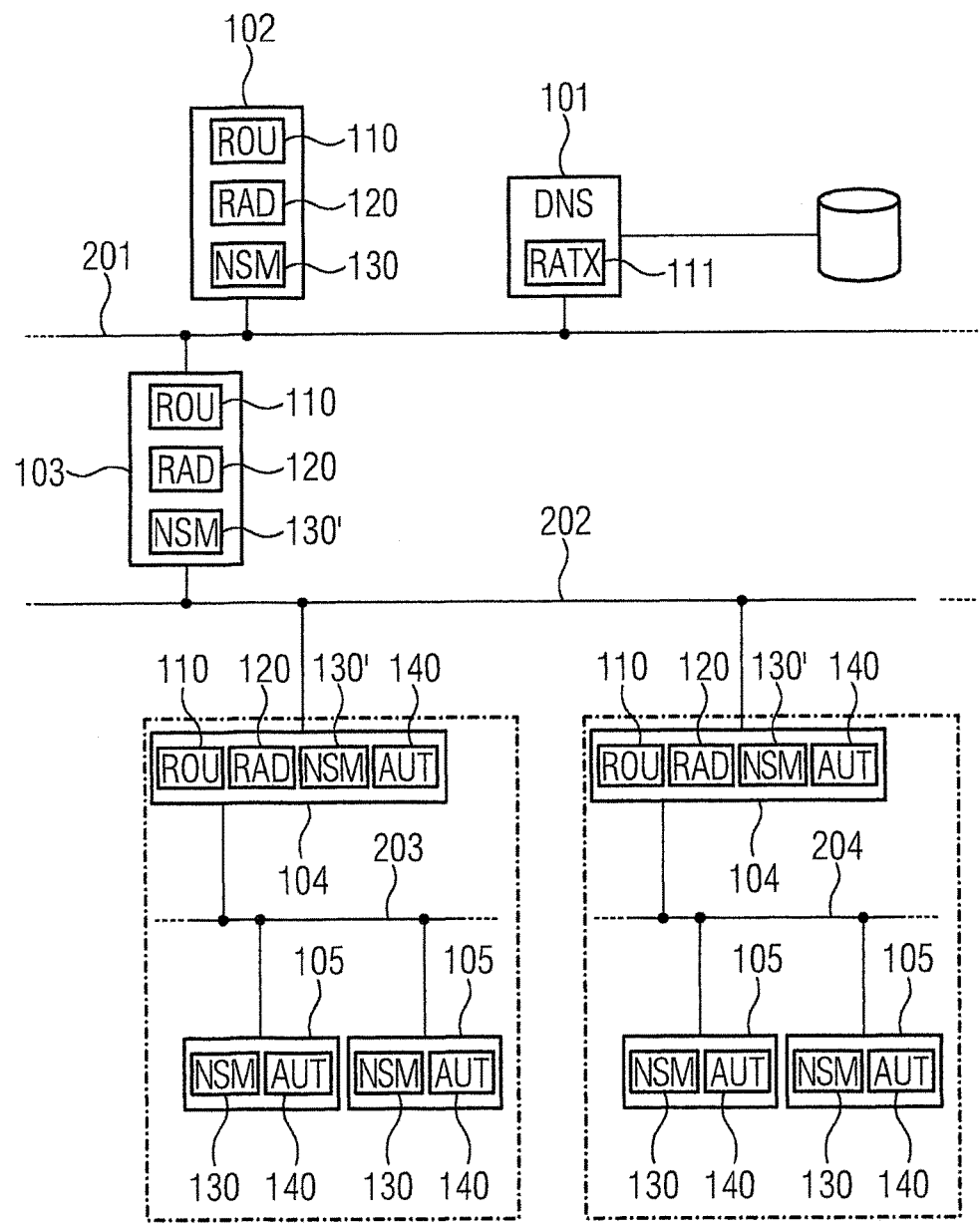
FIG. 1 shows a schematic block diagram of an industrial automation system with a DNS server, a number of subnetworks and automation devices to be configured in accordance with the invention.

The industrial automation system shown diagrammatically in FIG. 1 comprises a DNS server 101 (Domain Name System) without routing functions, a router 102 which is allocated to a base domain, a number of subnetworks 201, 202, 203, 204 with associated routers 103 or automation devices 104 exhibiting routing functions, and a plurality of modular automation devices 105 without routing functions. The automation devices 105 are, for example, stored-program controllers of a complex machine and each comprise a name service module 130 and an automation module 140 with an integrated communication unit. A complex machine can also comprise automation devices 104 with an integrated routing module 110 and a function unit 120 for distributing router advertisements (router advertisement daemon) within a machine-internal subnetwork 203, 204.

The automation modules 140 each additionally comprise at least one central processing unit and one input/output unit. The input/output units are used for an exchange of control and measurement quantities between the respective automation device 104, 105 and a machine or device controlled by the automation device 104, 105. The central processing units of the automation modules 140 are provided in particular for determining suitable control quantities from acquired measurement quantities. In the present exemplary embodiment, the above components of the automation devices 104, 105 are connected to one another via a backplane bus system.

Figure 2:
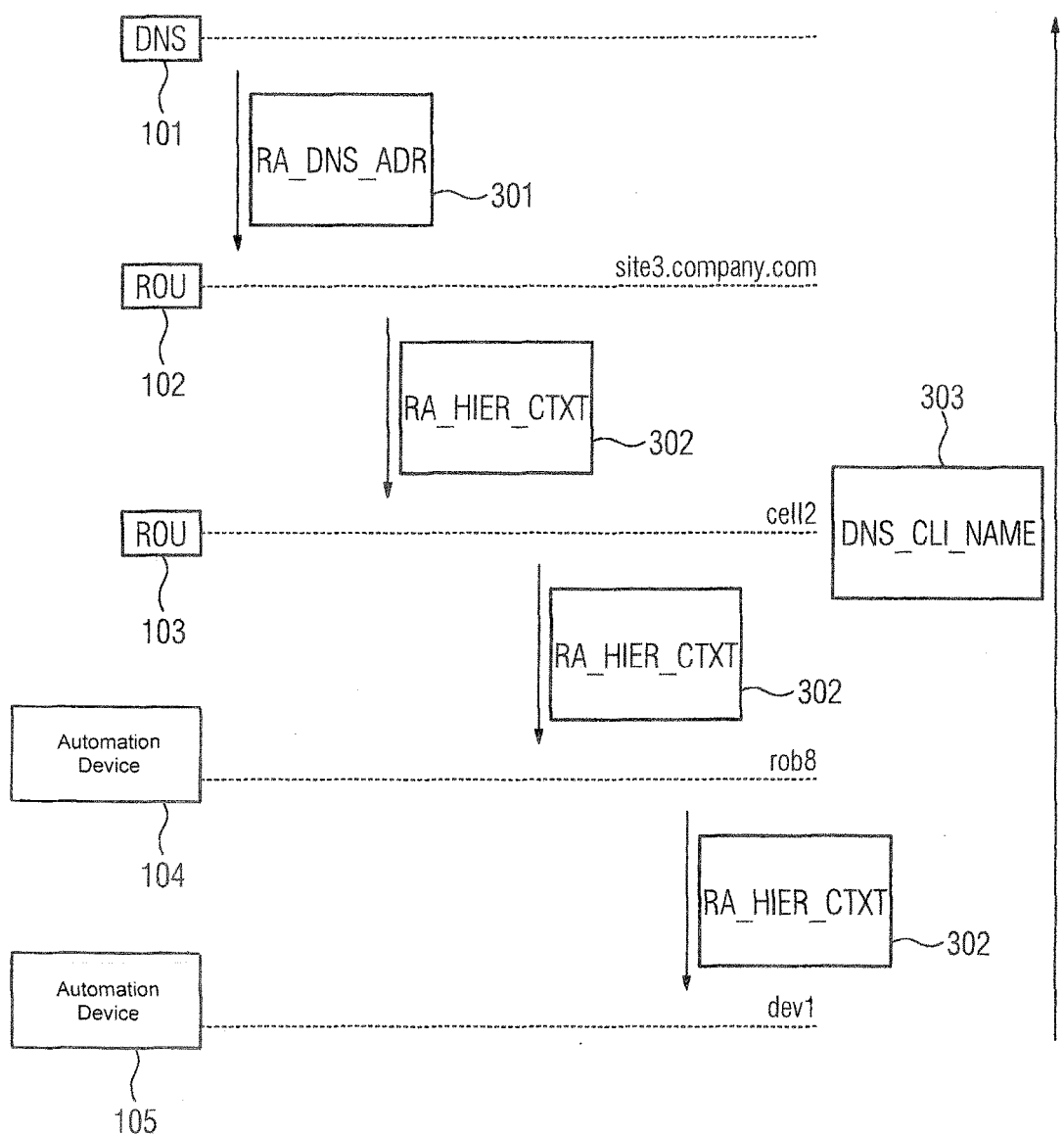
FIG. 2 shows a schematic block diagram of a data exchange between a DNS server, IPv6 routers and an automation device to be configured in accordance with the invention.

In accordance with FIG. 2, the DNS server 101 sends out messages 301 with router advertisements which comprise information on an IPv6 address of the DNS server 101. For this purpose, the DNS server 101 has a transmitter unit 111 for generating and transmitting messages 301 with router advertisements which comprise the IPv6 address of the DNS server 101.

In the present exemplary embodiment, all routers 102, 103 comprise, apart from a routing module 110, a router advertisement daemon 120 and a name service module 130'. It should also be understood that the routers 102, 103 also include a respective processor, microprocessor, as well as memory such as RAM and/or ROM (not shown). By means of the router advertisement daemons 120, the routers 102, 103 or automation devices 104, with routing functions, respectively, distribute IPv6 prefixes in each lower-level subnetworks 201-204. Here, the IPv6 prefixes are components of messages with router advertisements that are transmitted in accordance with Internet Control Message Protocol Version 6. The router advertisements comprise a topological or hierarchical name component of the respective router, the topological or hierarchical name component being allocated to a spatial or hierarchical arrangement of the respective router.

According to FIG. 2, the router 102 which is allocated to the base domain, receives from DNS server 101 the message 301 with router advertisement that comprises the IPv6 address of the DNS server 301 and accepts this information for its own router advertisements. In this context, the router 102 adds to its messages 301 with router advertisements in the present exemplary embodiment the name component "site3.company.com" as hierarchical name context RA_HIER_CTXT. A further topological or hierarchical name component that is allocated to a spatial or hierarchical arrangement of the respective router 103 or automation device 104, respectively, is supplemented by each lower-level router 103 or each automation device 104 with routing functions. Corresponding spatial or hierarchical information, in the present exemplary embodiment "cell2" and "rob8" are in this case added to a pre-existing hierarchical name context RA_HIER_CTXT. For example, "site3.company.com" is completed by "cell2" or "rob8" to form "cell2.site3.company.com" or "rob8.cell2.site3.company.com", respectively.

Router advertisements with name information from higher-level subnetworks are received via the respective name service module 130' by routers 102 allocated to lower-level subnetworks or automation devices 103 and supplemented by a topological or hierarchical name component allocated to the respective router 102 or automation device 103. By means of the respective router advertisement daemon 120, the router advertisements are distributed with the supplemented name information within the respective lower-level subnetwork.

The automation devices 104, 105 each generate their device name independently via their name service module 130, 130' from received topological or hierarchical name components and a name component that is unambiguous within their respective subnetwork. For this purpose, the automation devices 104, 105 evaluate the hierarchical name context RA_HIER_CTXT of the router advertisements. In addition, the automation devices 104, 105 independently generate their IPv6 address from IPv6 prefixes distributed via router advertisements within their respective subnetwork. The name service modules 130, 130' of the automation devices 104, 105 each comprise, in accordance with FIG. 3 or FIG. 4, respectively, one name service client 136 for dynamic DNS per IP interface, by which storage of an IPv6 address and of an associated device name of the respective communication device in the name service server is requested via the IPv6 address of the name service server. For this purpose, the automation devices 104, 105 each independently transmit a message 303 with a registration request to the DNS server 101 by which storage of their device name address allocation is triggered in the name service server 101.

Figure 3:
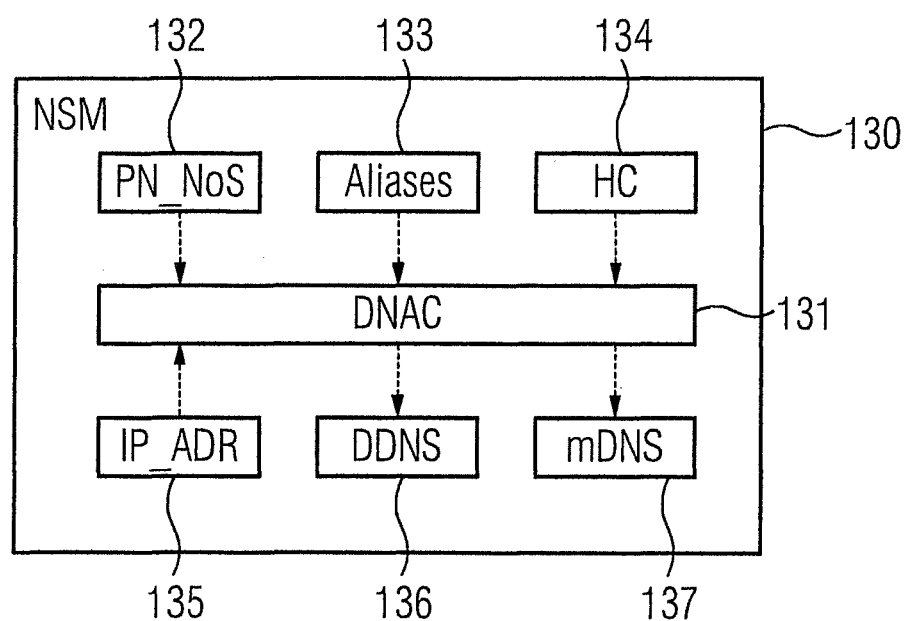
FIG. 3 shows a schematic block diagram of a name service module of an automation device without routing functions in accordance with the invention.
Figure 4:
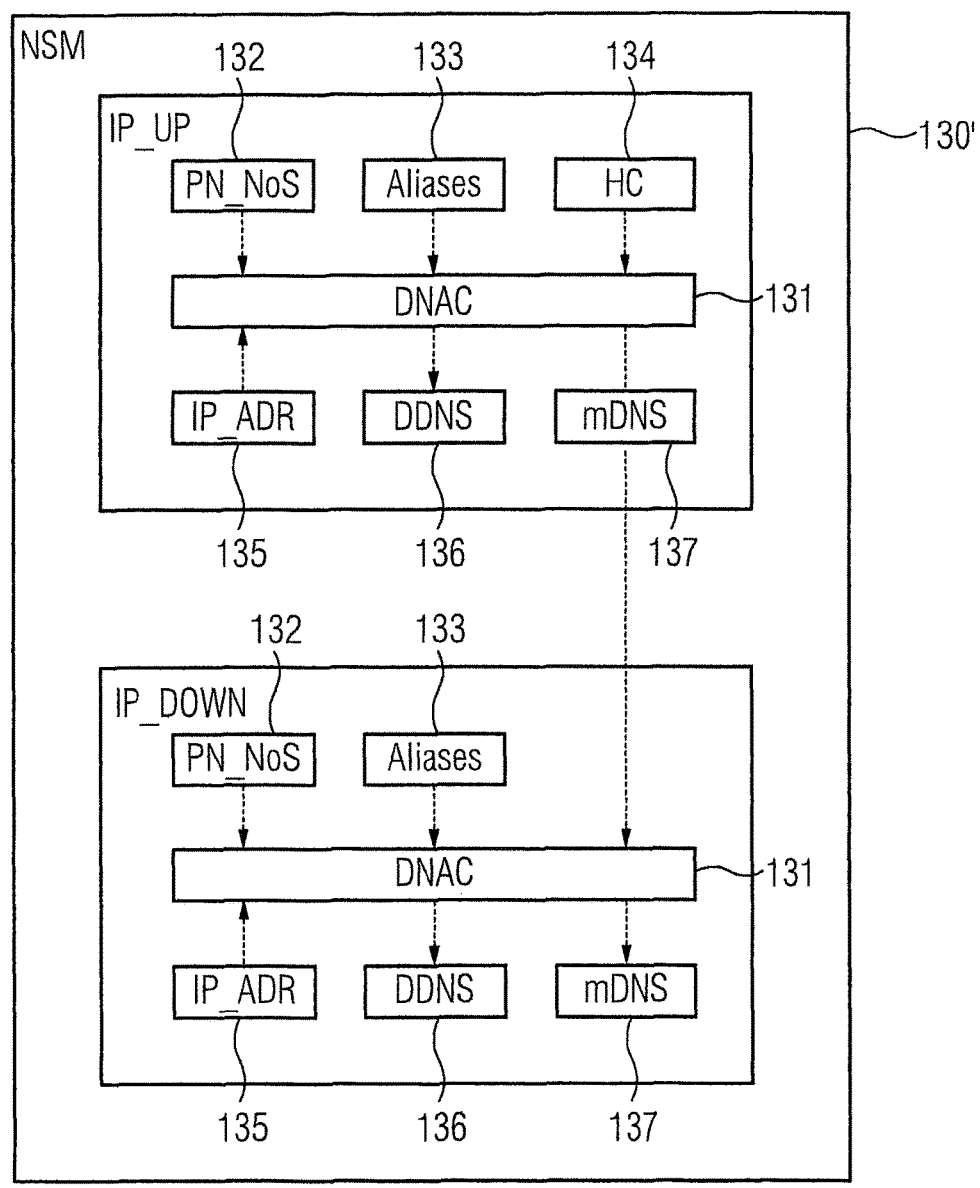
FIG. 4 shows a schematic block diagram of a name service module of an automation device with routing functions.

In addition, the name service modules 130, 130' of the routers 102, 103 and of the automation devices 104, 105, as shown in FIG. 3 or FIG. 4, respectively, comprise a domain name auto completer 131 as a name service component. The domain name auto completer 131 is, in each case, used for checking whether a device name with a topological or hierarchical name component, which designates a spatial or hierarchical arrangement of the respective router or automation device essentially completely, is allocated to the respective router or automation device. For this check, the domain name auto completer 131, in the present exemplary embodiment, accesses storage units 132, 133, 134 in which each PROFINET device names (PROFINET name of station), alias names and hierarchical name context are stored.

In the case of a positive result of the check, the routers or automation devices each treat their associated device name as a complete device name. Otherwise, the routers or automation devices, in case of a negative result of the check, independently generate from topological or hierarchical name components distributed via messages with router advertisements, and a name component unambiguous within their respective subnetwork, their complete device name.

Using their name service client 136, the routers or automation devices request storage of their communication network addresses and their associated complete device names and alias names in the DNS server. For this purpose, the respective domain name auto completer 131 accesses a storage unit 135 in which the IPv6 address for its associated IP interface is stored. Additionally, the name service modules 130, 130' comprise one name service component 137 per IP interface for multicast DNS by which they distribute information about communication network addresses and associated complete device names and alias names within their respective subnetwork in accordance with the Multicast DNS Protocol.

If a router or automation device has a number of IP interfaces and executes IP routing between these IP interfaces, the respective name service module 130' comprises, as shown in FIG. 4, in each case, one domain name auto completer 131 for higher-level network levels (IP_UP) and one domain name auto completer 131 for lower-level network levels (IP_DOWN). In this way, the respective name service module 130' can receive a hierarchical name context from a higher-level network level, expand the hierarchical name context and forward it to lower-level network levels.

Correspondingly, routers or automation devices that each have router and automation functions distribute, in the case of a positive result of the check, a complete topological or hierarchical name component comprising their device name as name information within their respective lower-level subnetwork via router advertisements. In the case of a negative result of the check, in contrast, routers or automation devices that each have router and automation functions receive router advertisements with name information from higher-level subnetworks, supplement these by a topological or hierarchical name component that is allocated to their respective spatial or hierarchical arrangement and distribute supplemented name information within their respective lower-level subnetwork via router advertisements.

Routers which do not have any automation functions receive router advertisements with name information from higher-level subnetworks and distribute these unchanged within their respective lower-level subnetwork by means of router advertisements. Furthermore, routers which are allocated to a name hierarchy origin or are arranged at the latter always treat their associated device names as complete device name. In the present exemplary embodiment, this applies to router 102 which is allocated to the base domain "site3.company.com". The name service module of this router can be designed analogously to the representation according to FIG. 3 since no hierarchical name context is accepted but is predetermined for lower-level network levels.

Figure 5:
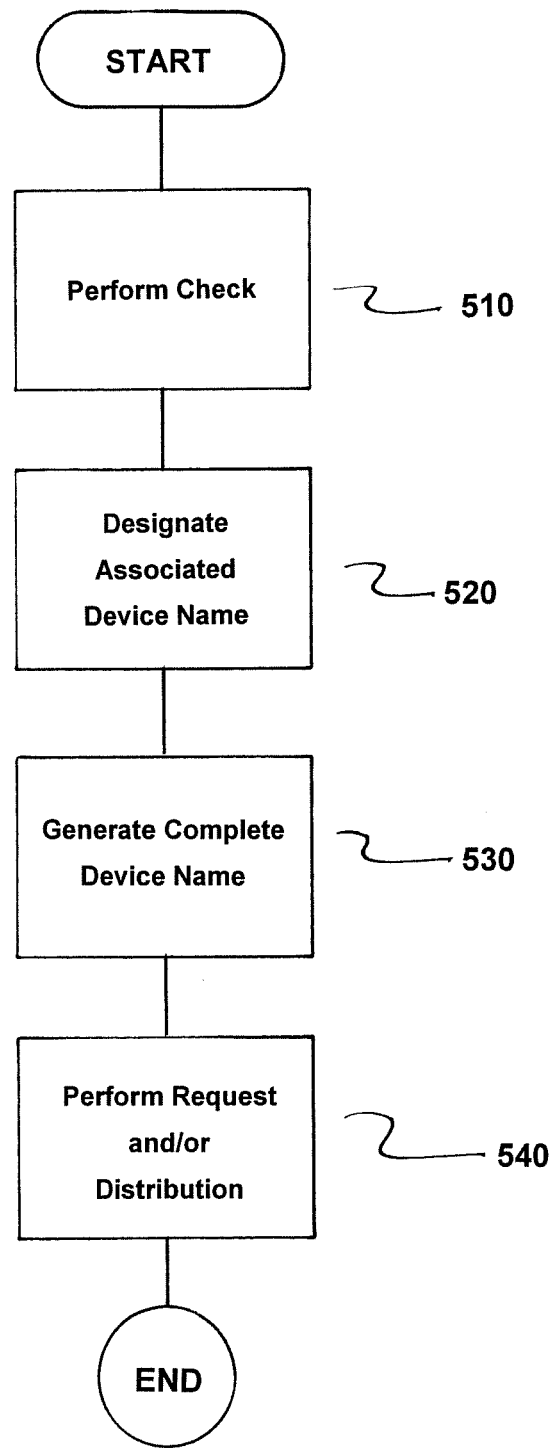
FIG. 5 is a flowchart of the method in accordance with the invention.

FIG. 5 is a flowchart of the method for providing a name service within an industrial automation system. The method comprises performing a check of each communication device of a plurality of communication devices of the industrial automation system via a name service component to determine whether a device name with at least one of (i) a topological and (ii) hierarchical name component, which essentially completely designates a spatial or hierarchical arrangement of a respective communication device, is allocated to the respective communication device, as indicated in step 510.

Next, an associated device name of the communication device as a complete device name in cases of a positive check result is designated by each communication device of the plurality of communication devices, as indicated in step 520.

Next, each communication device of the plurality of communication devices, independently generates the complete device name of the communication device from at least one of (i) the topological and (ii) the hierarchical name components distributed via messages with router advertisements and a name component unambiguous within their respective subnetwork in cases of a negative check result, as indicated in step 530.

Next, either each communication device of the plurality of communication devices (i) requests via a name service client for dynamic domain name system (DNS) storage of a communication network address of the communication device and associated complete device name in a name service server, and/or (ii) distributes, via a name service component for multicast DNS, information about each communication network address and the associated complete device name within a respective subnetwork of each communication device of the plurality of communication devices in accordance with Multicast DNS Protocol, as indicated in step 540.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for providing a name service within an industrial automation system, the method comprising:

performing a check of each communication device of a plurality of communication devices of the industrial automation system via a name service component to determine whether a device name with at least one of (i) a topological and (ii) hierarchical name component, which essentially completely designates a spatial or hierarchical arrangement of a respective communication device, is allocated to the respective communication device, designating, by each communication device of the plurality of communication devices, an associated device name of the communication device as a complete device name in cases of a positive check result;

independently generating, by each communication device of the plurality of communication devices, the complete device name of the communication device from at least one of (i) the topological and (ii) the hierarchical name components distributed via messages with router advertisements and a name component unambiguous within their respective subnetwork in cases of a negative check result; and at least one of in cases of the negative check:

(i) requesting, by each communication device of the plurality of communication devices via a name service client for dynamic domain name system (DNS), storage of a communication network address of the communication device and associated complete device name in a name service server, and (ii) distributing, via a name service component for multicast DNS, information about each communication network address and the associated complete device name within a respective subnetwork of each communication device of the plurality of communication devices in accordance with Multicast DNS Protocol.

2. The method as claimed in claim 1, wherein each communication device of the plurality of communication devices includes a router function and is integrated in an automation device, the method further comprising:

distributing, in cases of the positive check result, by each communication device at least one of (i) a complete topological name component and (ii) a complete hierarchical name component comprising their device name as name information within their respective lower-level subnetwork via router advertisements.

3. The method as claimed in claim 2, wherein each communication device of the plurality of communication devices includes a router function and is integrated in an automation device, the method further comprising:

receiving, in cases of the negative check result, router advertisements with name information from higher-level subnetworks, supplementing the received router advertisements with name information by at least one of (i) a topological and (ii) a hierarchical name component which is allocated to their respective spatial or hierarchical arrangement, and distributing supplemented name information within their respective lower-level subnetwork via router advertisements.

4. The method as claimed in claim 1, wherein each communication device of the plurality of communication devices includes a router function and is integrated in an automation device, the method further comprising:

receiving, in cases of the negative check result, router advertisements with name information from higher-level subnetworks, supplementing the received router advertisements with name information by at least one of (i) a topological and (ii) a hierarchical name component which is allocated to their respective spatial or hierarchical arrangement, and distributing supplemented name information within their respective lower-level subnetwork via router advertisements.

5. The method as claimed in claim 1, wherein each communication device of the plurality of communication devices includes a router function and no automation function, the method further comprising:

receiving, at each communication device, router advertisements with name information from higher-level subnetworks and distributing said received router advertisement by each communication device within their respective lower-level subnetwork via router advertisements.

6. The method as claimed in claim 1, further comprising:

designating by a communication device allocated to a name hierarchy origin its associated device name as a complete device name.

7. The method as claimed in claim 1, wherein the communication network addresses of the plurality of communication devices are Internet Protocol Version 6 (IPv6) addresses; and wherein the plurality of communication devices generate their IPv6 address independently from IPv6 prefixes distributed via router advertisements within their respective subnetwork.

8. The method as claimed in claim 7, wherein messages with router advertisements are transmitted in accordance with Internet Control Message Protocol Version 6.

9. The method as claimed in claim 1, further comprising:

requesting additionally by each communication device of the plurality of communication devices storage of associated alias names in the name service server via their name service client for dynamic DNS.

10. The method as claimed in claim 1, further comprising:

distributing additionally by each communication device of the plurality of communication devices information on their associated alias names within their respective subnetwork in accordance with Multicast Domain Name System (DNS) Protocol via their name service component for multicast DNS.

11. The method as claimed in claim 1, wherein the device names are PROFINET device names.

12. A communication device, comprising:

a processor;

memory; and a name service component stored in the memory and executed by the processor, said name service component checking whether a device name with at least one of (i) a topological and (ii) a hierarchical name component which essentially completely designates a spatial or hierarchical arrangement of a respective communication device is allocated to the respective communication device, the communication device being configured to designate, in cases of a positive check result, its associated device name as a complete device name and being configured to, in cases of a negative check result, independently generate its complete device name from at least one of (i) topological and (ii) hierarchical name components and a name component which is unambiguous within their respective subnetwork; and at least one of in cases of the negative check:

(i) a name service client for dynamic domain name system (DNS) stored in the memory and executed by the processor, said name service client for dynamic DNS requesting storage of a communication network address of the communication device and the complete device name in a name service server, and (ii) a name service component for multicast DNS stored in the memory and executed by the processor, said name service for multicast DNS distributing information about the communication network address and the complete device name within a subnetwork in accordance with Multicast DNS Protocol.

13. The communication device as claimed in claim 12, wherein the communication device includes a router function.

14. The communication device as claimed in claim 13, wherein the communication device is integrated in an automation device.

15. The communication device as claimed in claim 12, wherein the communication device is integrated in an automation device.

16. The communication device as claimed in claim 12, wherein the communication device is allocated to an origin of a device hierarchy.

\* \* \* \* \*